United States Patent [19]

Keggenhoff et al.

[11] 4,299,755

[45] Nov. 10, 1981

[54] NON-AQUEOUS DISPERSIONS OF WATER-SOLUBLE POLYMERS

[75] Inventors: Berthold Keggenhoff; Hans J. Rosenkranz, both of Krefeld, Fed. Rep. of Germany

[73] Assignee: Bayer Aktiengesellschaft, Fed. Rep. of Germany

[21] Appl. No.: 162,395

[22] Filed: Jun. 24, 1980

[30] Foreign Application Priority Data

Jun. 28, 1979 [DE] Fed. Rep. of Germany ....... 2926103

[51] Int. Cl.$^3$ .......................... C08J 3/08; C08K 5/01; C08L 33/00; C08L 91/00
[52] U.S. Cl. ............................ 260/23 AR; 260/23 R; 260/23 S; 260/33.6 R; 260/29.6 R
[58] Field of Search .............. 260/33.6 UA, 29.6 WQ, 260/23 R, 23 AR, 23 S

[56] References Cited

U.S. PATENT DOCUMENTS 4,029,622  6/1977  Keller et al. ............... 260/29.6 WQ

*Primary Examiner*—Allan Lieberman
*Attorney, Agent, or Firm*—Connolly and Hutz

[57] ABSTRACT

Stable non-aqueous dispersions having a high solids content which can rapidly be dissolved in water without forming lumps consist of water-soluble polymers, dispersing oil, sorbitan fatty acid esters and ehtoxylation products of fatty acids and/or fatty alcohols. The dispersions may be used, for example, as flocculating agents, retention agents, drilling auxiliaries and flooding additive.

4 Claims, No Drawings

NON-AQUEOUS DISPERSIONS OF WATER-SOLUBLE POLYMERS

This invention relates to stable non-aqueous dispersions of water-soluble polymers having a high solids content which can be rapidly dissolved in water without forming lumps.

It is known that water-in-oil emulsions (W/O emulsions) containing polymers can be prepared from water-soluble vinyl monomers by polymerisation in inverse emulsion (German Pat. No. 1,089,173). This is carried out by emulsifying aqueous monomer solutions in an inert hydrocarbon with the aid of a W/O emulsifier and polymerising with the aid of suitable catalysts.

According to German Offenlegungsschrift No. 2,354,006, extremely high molecular weight polymers are obtained if this polymerisation is carried out with the aid of UV light and photo-initiators. The emulsifiers used for preparing the emulsion must have a low HLB value (around 5). For a definition of the HLB value, see W. C. Griffin, Journal of the Society of Cosmetic Chemist, page 311 (1950). The usual W/O emulsifiers for this purpose are sorbitan fatty acid esters such as sorbitan mono-stearate, -palmitate and -oleate.

In German Offenlegungsschriften Nos. 2,432,699 and 2,537,586 the use of special emulsifier mixtures for W/O emulsion polymerisation is described, these emulsifiers consisting of mixtures of the usual W/O emulsifiers having a low HLB value with emulsifiers of a higher HLB value. An improvement in the stability of the aqueous W/O emulsion is thereby to be achieved.

Non-aqueous dispersions of high molecular weight, water-soluble polymers which are obtained by the polymerisation of at least one water-soluble $\alpha,\beta$-monoolefinically unsaturated monomer in a W/O emulsion with the aid of at least one photo-initiator and UV light have been disclosed in German Offenlegungsschrift No. 2,419,764. These dispersions are dehydrated azeotropically to a residual water-content of less than 5% by weight, based on the polymer, either before or after the addition of a water-soluble wetting agent.

These non-aqueous dispersions can be converted into aqueous solutions of the polymers simply by stirring them up with water. The W/O emulsifiers used according to the aforesaid German Offenlegungsschrift are the usual compounds, preferably sorbitan fatty acid esters and their ethoxylation products.

In contrast to its role in aqueous W/O emulsions, the W/O emulsifier performs several functions in these dispersions: It stabilises the anhydrous dispersion during azeotropic dehydration and storage as well as facilitating its solution in water.

The dispersions prepared ready for use which are described in the examples of German Offenlegungsschrift No. 2,419,764 have the comparatively low polymer content of about 35 to 36% by weight, based on the whole dispersion, i.e. including the water-soluble wetting agent.

For the usual applications, however, the polymer is the most important active substance while the other accompanying substances are merely auxiliary agents for preparing and dissolving the polymers in water.

It would therefore be advantageous to have at one's disposal non-aqueous dispersions of water-soluble polymers which, when containing a high proportion of polymers, e.g. 45 to 60% by weight, could be rapidly stirred up with water without forming lumps to produce dilute aqueous solutions.

If, however, attempts are made to obtain a substantial increase in the solids content simply by reducing the oil phase, then the viscosity of the dispersion increases sharply and the dispersion is no longer readily soluble in water since at this high viscosity it forms lumps and floccules when stirred up with water, and these could seriously interfere with the use of the dispersion.

If the sorbitan fatty acid esters are replaced by other emulsifiers which are basically suitable for W/O emulsions, the formation of lumps and coagulation set in either at the polymerisation stage or during azeotropic dehydration.

It has now been found that dispersions with a high solids content which have the characteristic of being readily dissolved in water, can be obtained if the oil phase contains strictly limited quantities of sorbitan fatty acid esters, certain ethoxylation products of fatty acids and/or fatty alcohols and optionally water-soluble wetting agents.

Although the special ethoxylation products are not capable on their own of stabilizing W/O emulsions, it is surprisingly found that their use according to the invention in the presence of sorbitan fatty acid esters in the oil phase results in non-aqueous dispersions having improved stability, reduced viscosity and improved solubility in water even when the polymer content is high.

The present invention relates to non-aqueous dispersions of water-soluble polymers consisting of
(a) 45–60 parts by weight of water-soluble polymers;
(b) 25–45 parts by weight of dispersing oil;
(c) 3–8 parts by weight of sorbitan fatty acid esters and
(d) 3–8 parts by weight of ethoxylation products of fatty acids and/or fatty alcohols,
the sum of components (a) to (d) being 100 parts by weight.

The water-soluble polymers (a) are homopolymers or copolymers of the corresponding water-soluble monomers. The following are given as examples of water-soluble monomers:

(1) Water-soluble carboxylic acids having 3 to 6, preferably 3 to 4 carbon atoms, such as acrylic acid, methacrylic acid, crotonic acid, maleic acid, itaconic acid, citraconic acid, aconitic acid and the alkali metal and ammonium salts of the above-mentioned acids, preferably acrylic acid, methacrylic acid and maleic acid;

(2) Water-soluble semi-esters of di- and tricarboxylic acids having 4 to 6 carbon atoms and monohydric aliphatic alcohols having 1 to 8 carbon atoms or their alkali metal and ammonium salts, e.g. maleic acid semi-esters or their alkali metal or ammonium salts;

(3) $\alpha,\beta$-monoolefinically unsaturated sulphonic acids such as vinyl sulphonic acid or styrene sulphonic acid or their alkali metal and ammonium salts;

(4) Water-soluble primary, secondary and tertiary amino alkyl esters of (meth)acrylic acid having 2 to 4 carbon atoms in the alkyl moiety, for example, dimethylaminoethyl(meth)acrylate, diethylaminoethyl(meth)acrylate, dimethylaminopropyl(meth)acrylate, dimethylaminobutylmethacrylate and their salts with inorganic or organic acids such as hydrochloric acid, sulphuric acid or acetic acid;

(5) Methacrylamide and acrylamide;

(6) Dialkylaminoalkyl(meth)acrylamides having 1 or 2 carbon atoms per alkyl moiety in the dialkylamino group, and their salts with inorganic or organic acids such as hydrochloric acid or acetic acid, e.g. dimethylaminomethyl(meth)acrylamide;

(7) N-methylol(meth)acrylamide or N-alkoxymethyl(meth)acrylamides having 1 to 2 carbon atoms in the alkoxy group, such as N-methoxymethyl(meth)acrylamide;

(8) Quaternary ammonium salts obtainable by reaction of monomers (4) and (6) with alkyl halides or dialkyl sulphate, e.g. the product of quaternisation of dimethylamino ethyl methacrylate with methyl chloride or dimethylsulphate.

In addition, the water-soluble polymer may contain, incorporated by polymerisation, up to 10% by weight of water-insoluble monomers such as styrene or esters of (meth)acrylic acid with aliphatic $C_1$–$C_8$ alcohols.

The preferred polymers include polyacrylamide, polyacrylic acid, copolymers of acrylamide and acrylic acid and copolymers of acrylamide and dimethylaminoethyl methacrylate.

The dispersing oil (b) may be any liquid which is immiscible with water and the aqueous monomer solutions. It is preferred to use liquid aliphatic and aromatic hydrocarbons and their substitution products and mixtures, such as benzene, toluene, xylene, cyclohexane, decaline, tetraline, mineral oils, kerosines, petroleum, petroleum hydrocarbons, mineral spirits and mixtures thereof.

Saturated aliphatic $C_8$ to $C_{20}$ hydrocarbons and mixtures thereof are particularly preferred.

The following are suitable sorbitan fatty acid esters (c): Sorbitan monooleate, -stearate, -laurate and -palmitate.

The following are suitable ethoxylation products (d): Fatty alcohols having 8 to 20 carbon atoms in the molecule, etherified with 3 to 10 mol of ethylene oxide per mol of alcohol, and fatty acids having 10 to 20 carbon atoms in the molecule, esterified with 3 to 10 mol of ethylene oxide per mol of fatty acid.

The following are mentioned as examples of fatty alcohols whose ethoxylation products are used according to the invention: Lauryl alcohol, stearyl alcohol, palmityl alcohol, oleyl alcohol, cetyl alcohol and the usual commercial mixtures of fatty alcohols of the formula $C_nH_{2n+1}OH$ where n=8 to 20. The following are examples of fatty acids whose ethoxylation products may be used according to the invention: Lauric acid, stearic acid, palmitic acid, oleic acid and commercial fatty acids usually obtained as mixtures, having the formula $C_nH_{2n+1}COOH$ where n=9 to 20.

Water-soluble wetting agents may also be added to the dispersion according to the invention in quantities of 3 to 10 parts by weight to 100 parts by weight of the dispersion to improve its solubility in water.

The following water-soluble wetting agents may be used: Ethoxylated alkyl or aralkyl phenols having 8 to 20 carbon atoms in the alkyl or aralkyl group, for example nonyl phenols or benzylated 4-hydroxydiphenyl having polyether chains containing 7 to 20 ethylene oxide units, or reaction products of fatty alcohols having 8 to 20 carbon atoms or fatty acids having 12 to 20 carbon atoms and 11 to 50 ethylene oxide units.

The dispersions according to the invention are prepared as follows:

A water-in-oil monomer emulsion is first prepared from an aqueous solution of the water-soluble monomers (a), which are at a concentration of 20 to 80% by weight, preferably 40 to 60% by weight or the saturated concentration at the ambient temperature, the dispersing oil (b) and emulsifiers (c) and (d) with the aid of high shearing forces. This emulsion is converted into the corresponding polymer emulsion by radical polymerisation. This polymerisation may be carried out by the addition of the usual radical formers which are activated by heat, such as azo compounds, e.g. azo-bis-isobutyronitrile, or organic peroxides, e.g. benzoyl peroxide, and heating to temperatures of 50 to 100° C., but polymerisation is preferably effected by exposure to UV light in the presence of suitable photo-initiators as described in German Offenlegungsschrift No. 2,354,006.

The usual photo-initiators are used, e.g. benzophenone or aromatic keto compounds in general which are derived from benzophenone, such as alkylbenzophenones, halogenmethylated benzophenones according to German Offenlegungsschrift No. 1,949,010; Michlers ketone; anthrone and halogenated benzophenones. Benzoin and its derivatives are also suitable, e.g. as described in German Offenlegungsschriften Nos. 1,769,168; 1,769,853; 1,769,854; 1,807,297; 1,807,301 and 1,919,678 and German Auslegeschrift No. 1,694,149. Anthraquinone and many of its derivatives, such as β-methyl anthraquinone, tertiary butyl anthraquinone and anthraquinone carboxylic acid esters, and oxime esters according to German Offenlegungsschrift No. 1,795,089 are also effective photo-initiators.

Particularly suitable examples of photo-initiators include benzoin and its alkyl ethers such as its methyl, ethyl, propyl and isopropyl ethers; aromatic acyloins substituted in the α-position or their ethers, such as the alkali metal salts of α-propionic acid benzoin ethyl ether, and benzyl dialkyl ketals such as benzyl dimethyl ketal.

The photo-initiators are used at concentrations of 0.002 to 2% by weight, preferably 0.01 to 0.1% by weight, based on the quantity of monomers used. One or more photo-initiators may be used.

The sources of light used for carrying out photopolymerisation may be artificial sources emitting at 1500 to 5000 Å, preferably 3000 to 4000 Å. It is advantageous to use mercury vapour lamps, xenon lamps, tungsten lamps, fluorescent tubes, carbon arc lamps or sunlight. Fluorescent tubes are particularly suitable.

The water-containing polymer emulsions obtained in this manner are equal in their stability and other properties to known emulsions, for example those described in German Offenlegungsschrift No. 2,354,006. They are converted into non-aqueous polymer dispersion by azeotropic removal of the water by distillation.

Removal of the water from the W/O emulsion is normally carried out by the addition of organic liquids which form azeotropic mixtures with water, such as benzene, toluene or heptane, followed by heating to boiling. It is particularly advantageous to use the organic liquid serving as oil phase as the azeotropic dehydrating agent. The azeotropic mixture is distilled off, optionally at reduced pressure, and separates after its condensation into an aqueous phase and an organic phase. This process is continued until almost all the water has been removed from the polymer. The organic phase may, if desired, be continuously returned to the reaction vessel by way of a water separator.

Azeotropic distillation is carried out at temperatures below 100° C., preferably at 50° to 70° C., and if desired at reduced pressure. It may be carried out batchwise but is preferably carried out continuously e.g. in downstream evaporators or thin layer evaporators.

The resulting anhydrous dispersions which have a residual water content of at the most 5% by weight are superior in their stability to known dispersions, which separate after a few days into the polymer, which settles to the bottom, and a clear supernatant layer of dispersing oil, whereas the dispersions according to the invention show no signs of separation of the polymer even after several weeks of storage. They have a polymer content of 45 to 60 parts by weight, based on 100 parts by weight of the dispersion.

To promote smoother and more rapid solution of the dispersions in water, the water-soluble wetting agents mentioned above may be added after dehydration of the dispersions. Additional dispersing oil may also be added to adjust the polymer content if desired.

The dispersions according to the invention are surprisingly found to have a substantially lower viscosity than known dispersions of the same polymer content. Their main advantage is that they dissolve smoothly in water without the formation of lumps or floccules whereas known dispersions at such high polymer contents, although capable of being stirred into water, form lumps which can only be removed by prolonged stirring if at all.

The dispersions according to the invention of water-soluble polymers may be used, for example, as flocculating agents for the clarification of effluent, as retention and reinforcing agents in the manufacture of paper, as drilling auxiliaries and as flooding additive for tertiary oil recovery.

The following Examples illustrate the invention without restricting it.

COMPARISON EXAMPLE 1

(analogous to Example 1 of German Offenlegungsschrift No. 2,419,764)

Oil phase:
  400 g of a $C_{12}$–$C_{18}$ paraffin mixture
  80 g of sorbitan monooleate
  0.2 g of benzoin isopropyl ether
Aqueous phase:
  280 g of acrylamide
  120 g of dimethylaminoethyl methacrylate
  317 g of water
  87 g of 50% sulphuric acid (pH 5)
Experimental method:

The reaction vessel used was a cylindrical vessel of 1.5 l capacity equipped with stirrer and water-cooled external jacket and containing a superactinicfluorescent tube arranged concentrically therein as the source of UV light. A W/O monomer emulsion was prepared from the aqueous and oil phase with the aid of a high speed mixer, and the emulsion was introduced into the reaction vessel and flushed with nitrogen for 30 minutes to eliminate oxygen. Polymerisation was then started by UV light and continued for 60 minutes to complete conversion, while the jacket of the vessel was cooled with water.

The W/O polymer emulsion obtained was dehydrated to a water content below 2% in a rotary evaporator at 60° C. and 15 Torr, part of the paraffin mixture being distilled off azeotropically with the water. The polymer content of the resulting dispersion was determined by precipitation in an ethanol/acetone mixture and found to amount to 57% by weight. 35 g of ethoxylated nonyl phenol (10 mol of ethylene oxide per mol of phenol) and 73 g of a $C_{12}$–$C_{18}$ paraffin mixture were then added to the dispersion to adjust it to a polymer content of 50%. The resulting dispersion is entered in Table 1 as comparison dispersion A.

EXAMPLE 1

Oil phase:
  400 g of a $C_{12}$–$C_{18}$ paraffin mixture
  40 g of sorbitan monooleate
  40 g of ethoxylate of oleic acid with 6 mol of ethylene oxide
  0.2 g of benzoin isopropyl ether.
Aqueous phase: As in Comparison Example 1
Method: As in Comparison Example 1

The resulting dispersion is entered in Table 1 as dispersion A 1.

EXAMPLE 2

Oil phase:
  400 g of a $C_{12}$–$C_{18}$ paraffin mixture
  40 g of sorbitan monooleate
  40 g of ethoxylate of lauryl alcohol with 3 mol of ethylene oxide
  0.2 g of benzoin isopropyl ether.
Aqueous phase: As in Comparison Example 1
Method: As in Comparison Example 1

The resulting dispersion is entered in Table 1 as dispersion A 2.

COMPARISON EXAMPLE 2

Oil Phase:
  400 g of a $C_{12}$–$C_{18}$ paraffin mixture
  80 g of sorbitan monooleate
  0.2 g of benzoin isopropyl ether
Aqueous phase:
  400 g of acrylamide
  400 g of water
Method: As in Comparison Example 1.

The dispersion has a polymer content of 53% after dehydration. 45 g of ethoxylated nonyl phenol (10 mol of ethylene oxide per mol of phenol) are added so that the polymer content obtained is 50%. The resulting dispersion is entered in Table 1 as Comparison dispersion B.

EXAMPLE 3

Oil phase:
  400 g of a $C_{12}$–$C_{18}$ paraffin mixture
  40 g of sorbitan monooleate
  40 g of ethoxylate of oleic acid with 6 mol of ethylene oxide
  0.2 g of benzoin isopropyl ether
Aqueous phase: As in Comparison Example 2
Method: As in Comparison Example 1

The resulting dispersion is entered in Table 1 as dispersion B 1.

EXAMPLE 4

Oil phase:
  400 g of a $C_{12}$–$C_{18}$ paraffin mixture
  40 g of sorbitan monooleate
  40 g of ethoxylate of lauryl alcohol with 3 mol of ethylene oxide
Aqueous phase: As in Comparison Example 2
Method: As in Comparison Example 1

The resulting dispersion is entered in Table 1 as dispersion B 2.

Table 1 first shows the viscosity of the dispersion measured with a viscotester. To determine the solubility in water, 200 g of water were introduced into a glass beaker, 2 g of dispersion were poured into the water and the mixture was stirred with a glass rod for 15 seconds. The solution was then tested visually for any inhomogeneity.

TABLE 1

| Dispersion | Viscosity (mPas) | Solubility in water |
|---|---|---|
| Comparison dispersion A | 350 | floccules |
| Dispersion A 1 | 40 | dissolves smoothly |
| Dispersion A 2 | 30 | dissolves smoothly |
| Comparison dispersion B | 200 | floccules |
| Dispersion B 1 | 150 | dissolves smoothly |
| Dispersion B 2 | 50 | dissolves smoothly |

We claim:

1. A non-aqueous dispersion of a water-soluble polymer consisting of
    (a) 45–60 parts by weight of a water-soluble polymer prepared by the addition polymerization of an unsaturated water-soluble monomer;
    (b) 25–45 parts by weight of a dispersing oil which is a liquid aliphatic or aromatic hydrocarbon, a substitution product thereof or a mixture thereof;
    (c) 3–8 parts by weight of a member selected from the group consisting of a sorbitan monooleate, sorbitan stearate, sorbitan laurate and sorbitan palmitate; and
    (d) 3–8 parts by weight of the reaction product of 3 to 10 mol of ethylene oxide and 1 mol of a member selected from the group consisting of $C_8$–$C_{20}$ fatty alcohols and $C_{10}$–$C_{20}$ fatty acids, the sum of components (a) to (d) being 100 parts by weight.

2. A non-aqueous dispersion of claim 1 containing 3 to 10 parts by weight of water-soluble wetting agent per 100 parts of dispersion, said wetting agent being an ethoxylated alkyl or aralkyl phenol having 8 to 20 carbon atoms in the alkyl or aralkyl group, an ethoxylated fatty alcohol having 8 to 20 carbon atoms with 11 to 50 ethylene oxide units or an ethoxylated fatty acid having 12 to 20 carbon atoms with 11 to 50 ethylene oxide units.

3. A non-aqueous dispersion of claim 1 wherein component (b) is a saturated aliphatic $C_8$–$C_{20}$ hydrocarbon.

4. A non-aqueous dispersion of claim 1 wherein component (a) is polyacrylamide, a polyacrylic acid, a copolymer of acrylamide and acrylic acid or a copolymer of acrylamide and dimethylamino ethyl methacrylate.

* * * * *